United States Patent
Silvernail

(10) Patent No.: US 11,182,839 B2
(45) Date of Patent: Nov. 23, 2021

(54) SYSTEM AND METHOD FOR UPLOADING VIDEO FILES TO A REAL ESTATE LISTING AND FOR REPORTING INTEREST LEVEL IN A REAL ESTATE LISTING

(71) Applicant: Unison Holdings LLC, Wyoming, MI (US)

(72) Inventor: Brian D. Silvernail, Wyoming, MI (US)

(73) Assignee: Unison Holdings LLC, Wyoming, MI (US)

( * ) Notice: Subject to any disclaimer, the term of this patent is extended or adjusted under 35 U.S.C. 154(b) by 749 days.

(21) Appl. No.: 14/649,639

(22) PCT Filed: Dec. 6, 2013

(86) PCT No.: PCT/US2013/073604
§ 371 (c)(1),
(2) Date: Jun. 4, 2015

(87) PCT Pub. No.: WO2014/089447
PCT Pub. Date: Jun. 12, 2014

(65) Prior Publication Data
US 2015/0310523 A1 Oct. 29, 2015

Related U.S. Application Data
(60) Provisional application No. 61/734,316, filed on Dec. 6, 2012.

(51) Int. Cl.
*G06Q 30/06* (2012.01)
*G06Q 50/16* (2012.01)
(52) U.S. Cl.
CPC ......... *G06Q 30/0623* (2013.01); *G06Q 50/16* (2013.01)

(58) Field of Classification Search
CPC .......................... G06Q 30/0623; G06Q 50/16
(Continued)

(56) References Cited

U.S. PATENT DOCUMENTS

| | | | | |
|---|---|---|---|---|
| 6,411,724 B1* | 6/2002 | Vaithilingam | .... | G06F 17/30038 382/100 |
| 8,095,434 B1* | 1/2012 | Puttick | .............. | G06F 17/30241 705/26.9 |

(Continued)

FOREIGN PATENT DOCUMENTS

| | | |
|---|---|---|
| CN | 1759388 A | 4/2006 |
| CN | 101030868 A | 9/2007 |

(Continued)

OTHER PUBLICATIONS

Podmolik, Mary Ellen, "Multiple Listing Service Provider Broadens Its Scope," Chicago Tribune, Apr. 8, 2011 (Year: 2011).*

(Continued)

*Primary Examiner* — Richard W. Crandall
(74) *Attorney, Agent, or Firm* — Price Heneveld LLP

(57) ABSTRACT

A property video listing system is provided including an Internet-connected server configured to: provide a website for receiving a plurality of video files from a user to upload in association with a property listing; upload all of the received video files to a video hosting service while providing identifying data with each uploaded video file; and display the property listing and provide thumbnail photos with links to each of the uploaded video files whereby visitors of the website may view the video files within the property listing. Alternatively/additionally, the server may: identify each thumbnail photo by one of a plurality of different feature designations; track access by visitors of each of the video files; and generate reports of relative interest in each property listing by the visitors as a function (Continued)

of an extent of access by the visitors of the video files associated with each property listing.

14 Claims, 12 Drawing Sheets

(58) Field of Classification Search
USPC .......................................................... 705/313
See application file for complete search history.

(56) References Cited

U.S. PATENT DOCUMENTS

| | | | | |
|---|---|---|---|---|
| 8,285,121 | B2* | 10/2012 | Kulas | H04N 7/173 386/278 |
| 9,076,175 | B2* | 7/2015 | Ramer | G06Q 30/02 |
| 2002/0107776 | A1* | 8/2002 | Bove | G06Q 30/02 705/37 |
| 2004/0138943 | A1 | 7/2004 | Silvernail | |
| 2007/0294622 | A1* | 12/2007 | Sterner | G06Q 30/00 715/716 |
| 2009/0048859 | A1* | 2/2009 | McCarthy | G06Q 30/02 705/346 |
| 2011/0004560 | A1* | 1/2011 | Knake | G06Q 30/02 705/313 |
| 2011/0194730 | A1* | 8/2011 | Rhoads | G06F 21/10 382/100 |
| 2012/0265633 | A1* | 10/2012 | Wohlstadter | G06Q 40/00 705/26.3 |
| 2012/0311431 | A1 | 12/2012 | Breaker et al. | |

FOREIGN PATENT DOCUMENTS

| | | |
|---|---|---|
| CN | 101802857 A | 8/2010 |
| CN | 102027501 A | 4/2011 |
| CN | 102667747 A | 9/2012 |

OTHER PUBLICATIONS

Nakodari, Dec. 15, 2008, "How To Upload Multiple Videos to YouTube Easily," < https://www.addictivetips.com/windows-tips/how-to-upload-multiple-videos-to-youtube-easily/> (Year: 2008).*

Dedhia, Sandip, Aug. 31, 2009, "Upload Multiple Videos with YouTube Uploader," < http://www.blogsdna.com/4566/upload-multiple-videos-on-youtube-with-youtube-uploader.htm> (Year: 2009).*

Christies Real Estate Videos, [online], archived on Jul. 22, 2012, available at: < https://web.archive.org/web/20120722045034/https://www.christiesrealestate.com/luxury-property-videos > (Year: 2012).*

* cited by examiner

Enter Fields Below to Create Account

Login | Create Account

Create Account

*First Name:
*Last Name:
Designation:
Company:
Address:
City:
State:
Zip:
Phone:
*Email:
Specializations:
Areas Served:
Description:
Photo: UPLOAD
YouTube URL:
Agent Linked URLs:
*Password:
*Confirm Password:

Brandable Customizable Player Options

Company Logo: UPLOAD
Agent/Team Logo: UPLOAD
Dark Color Choice:
Light Color Choice:

Non-Branded Customizable Player Options

MLS Logo: UPLOAD
Dark Color Choice:
Light Color Choice:

Customizable Scheduling Parameters

Where
☐ Facebook
☐ Twitter
☐ LinkedIn
☐ Google+
☐ Pinterest

When
☐ Weekly
☐ Bi-Weekly
☐ Monthly

Submit

FIG. 2

| Create Listings | Import Listings | Upload Videos | Share Listings | Review/Analyze Offers | MY ACCOUNT |
|---|---|---|---|---|---|
| | | | | | Account Info |

7303 Grachen Dr SE Grand Rapids, MI 49546

Listing Price: 138500

Bedrooms: 5

Bathrooms: 4 full, 2 half

Square Footage: 2975

Type: Single Family

School District: Forest Hills

County: Kent

Listed By:
John Doe
555-555-5555

MAP

This is my Listing!

Exceptional custom built 5-bedroom walkout. Thornapple River - 105' of frontage. Detailed distinctive home has Australian Cypress wood & slate floors, Granite counter tops, custom cabinetry, Pela Architect Series windows, detail ceilings, 3 paneled Shaker style doors, Rocky Mountain hardware, and much more. Kitchen – Granite countertops, glass tile backsplash, a hammered copper sink, Sub Zero and Wolfe appliances. Gathering room with a fireplace, 4-season sunroom & dining area. Master bedroom suite has a steam shower in the bath. Office with half bath – separate from main house. The walkout level – great family room, specious bar with icemaker, 48" cooler, wine rack, and Granite counter with stool seating. Also, built-in workspace, theater room, workout room, and large storage room with a rolling door to the backyard. The upper level is a spacious 1-bedroom apartment, Granite in kitchen. Geo-thermal heat system, stereo surround, extra deep 3rd garage stall, expansive patio off the house.

| MLS PHOTO #1 | MLS PHOTO #2 | MLS PHOTO #3 | MLS PHOTO #4 | MLS PHOTO #5 | MLS PHOTO #6 |
|---|---|---|---|---|---|

FIG. 3

MY ACCOUNT

Create Listings | Import Listings | Upload Videos | Share Listings | Review/Analyze Offers | Account Info

Manage Videos - 7303 Grachen Dr SE Grand Rapids, MI 49546

Does your listing have a webpage? Enter it here:

Would you like to insert a Lead Generation Form?

[ Lead Contact Form ]

1 | Thumbnail Photo #1 | IMG_0006.mov / Select Feature... | [Choose Thumbnail] | ▲ Play | ✥ Move | × Delete 2 | Thumbnail Photo #2 | IMG_0009.mov / Select Feature... | [Choose Thumbnail] | ▲ Play | ✥ Move | × Delete 3 | Thumbnail Photo #3 | IMG_0010.mov / Select Feature... | [Choose Thumbnail] | ▲ Play | ✥ Move | × Delete 4 | Thumbnail Photo #4 | IMG_0011.mov / Select Feature... | [Choose Thumbnail] | ▲ Play | ✥ Move | × Delete 5 | Thumbnail Photo #5 | IMG_0012.mov / Select Feature... | [Choose Thumbnail] | ▲ Play | ✥ Move | × Delete 6 | Thumbnail Photo #6 | IMG_0013.mov / Select Feature... | [Choose Thumbnail] | ▲ Play | ✥ Move | × Delete ( Render Summary Video )

( Finished )

FIG. 6

MY ACCOUNT

Create Listings  Import Listings  Upload Videos  Share Listings  Review/Analyze Offers  Account Info

Manage Videos - 7303 Grachen Dr SE Grand Rapids, MI 49546

Does your listing have a webpage? Enter it here:

| 1 | Thumbnail Photo #1 | IMG_0006.mov Summary | Choose Thumbnail | ▲ Play | ✥ Move | ✕ Delete |

| 2 | Thumbnail Photo #2 | IMG_0009.mov Front Yard | Choose Thumbnail | ▲ Play | ✥ Move | ✕ Delete |

| 3 | Thumbnail Photo #3 | IMG_0010.mov Living Room | Choose Thumbnail | ▲ Play | ✥ Move | ✕ Delete |

Lead Contact Form

| 4 | Thumbnail Photo #4 | IMG_0011.mov Bathroom 1 | Choose Thumbnail | ▲ Play | ✥ Move | ✕ Delete |

| 5 | Thumbnail Photo #5 | IMG_0012.mov Kitchen | Choose Thumbnail | ▲ Play | ✥ Move | ✕ Delete |

( Render Summary Video )

( Finished )

FIG. 7

| Create Listings | Import Listings | Upload Videos | Share Listings | Review/Analze Offers | Account Info | MY ACCOUNT |

7303 Grachen Dr SE Grand Rapids, MI 49546

DOWNLOAD PROPERTY PACKAGE

EMBEDDED VIDEO PLAYER FOR PLAYING SELECTED VIDEO

| Summary<br>▲ Thumbnail Photo #1 | Front Yard<br>▲ Thumbnail Photo #2 | Living Room<br>▲ Thumbnail Photo #3 |
| Bathroom 1<br>▲ Thumbnail Photo #4 | Kitchen<br>▲ Thumbnail Photo #5 | Master Bedroom<br>▲ Thumbnail Photo #6 |

🕒 Request a Showing...
Open House Dates
www.realestate.com/12345
www.grrealty.com/123456
Listed By:
John Doe
555-555-5555

MAP

Listing Price: $138500
Bedrooms: 5
Bathrooms: 4 full, 2 half
Square Footage: 2975
Type: Single Family
School District: Forest Hills
County: Kent Exceptional custom built 5-bedroom walkout. Thornapple River – 105' of frontage. Detailed distinctive home has Australian Cypress wood & slate floors, Granite counter tops, custom cabinetry, Pella Architect Series windows, detail ceilings, 3 paneled Shaker style doors, Rocky Mountain hardware, and much more. Kitchen – Granite countertops, glass tile backsplash, a hammered copper sink, Sub Zero and Wolfe appliances. Gathering room with a fireplace, 4-season sunroom & dining area. Master bedroom suite has a steam shower in the bath. Office with half bath – separate from main house.

FIG. 8

Create Listings  Import Listings  Upload Videos  Share Listings  Review/Analze Offers  Account Info

MY ACCOUNT

7303 Grachen Dr SE - LEADS

| Name | Phone | Email | When |
|---|---|---|---|
| Aaron Adams | 123-555-0001 | aadams@yahoo.com | December 1, 2013 |
| Blake Brown | 123-555-0002 | bbrown@yahoo.com | December 1, 2013 |
| Carol Cox | 123-555-0003 | ccox@yahoo.com | December 1, 2013 |
| Denice Davis | 123-555-0004 | ddavis@yahoo.com | December 1, 2013 |
| Erin Estrada | 123-555-0005 | eestrada@yahoo.com | December 1, 2013 |

FIG. 9

| Create Listings | Import Listings | Upload Videos | Share Listings | Review/Analyze Offers | Account Info | MY ACCOUNT |

Review Listing Statistics

| ID | Listing | Total Hits | Unique Hits | Summary Plays | Showings | Feature Plays | Warm Leads | Leads | Showings Summary | Leads Showings | Leads Summary | Matrix Engagement |
|----|---------|-----------|-------------|---------------|----------|---------------|------------|-------|------------------|----------------|---------------|-------------------|
| 84 | Watson SW | 553 | 330 | 104 | 70 | 319 | 23 | 5 | 67.3% | 7.1% | 4.8% | 11.7% |
| 85 | Meadows Pointe | 429 | 231 | 47 | 1 | 16 | 2 | 1 | 2.1% | 100.0% | 2.1% | 5.5% |
| 86 | Ivanrest Avenue | 799 | 507 | 210 | 172 | 698 | 41 | 5 | 81.9% | 2.9% | 2.4% | 14.9% |
| 87 | Eastern Place | 333 | 207 | 83 | 68 | 295 | 19 | 0 | 81.9% | 0.0% | 0.0% | 18.3% |
| 88 | Amy Street NW | 321 | 204 | 70 | 20 | 110 | 8 | 2 | 28.6% | 10.0% | 2.9% | 9.8% |
| 90 | E. Beltline NE | 331 | 207 | 76 | 43 | 233 | 13 | 4 | 56.6% | 9.3% | 5.3% | 13.6% |
| 91 | 7303 Grachen Dr SE | 344 | 220 | 70 | 53 | 154 | 12 | 3 | 75.7% | 5.7% | 5.7% | 14.5% |
|    | Totals: 3110 | 1906 | 660 | 427 | 1825 | 118 | 20 | 64.7% | 4.7% | 3.0% | 12.6% |

FIG. 11

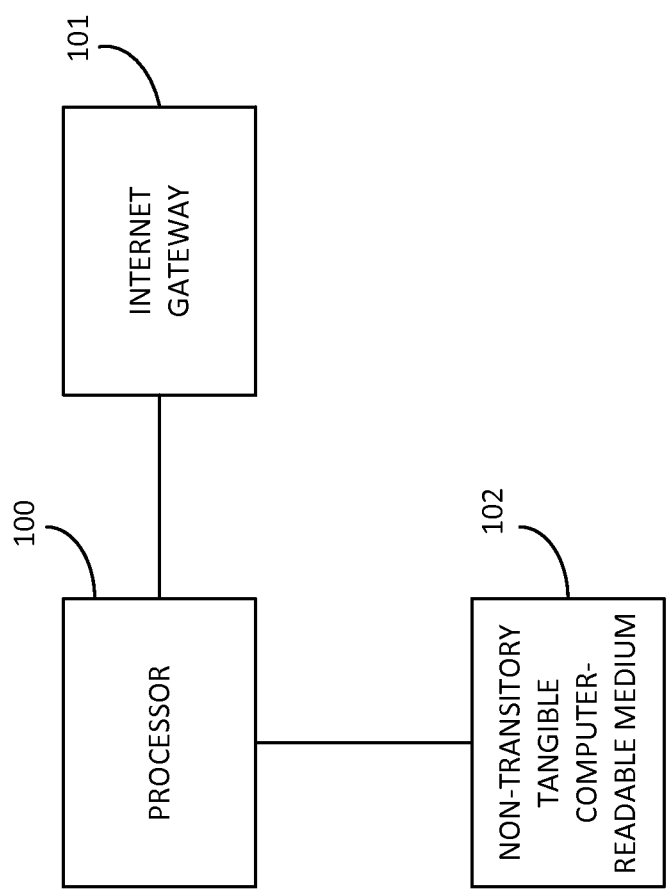

SYSTEM AND METHOD FOR UPLOADING VIDEO FILES TO A REAL ESTATE LISTING AND FOR REPORTING INTEREST LEVEL IN A REAL ESTATE LISTING

CROSS-REFERENCE TO RELATED APPLICATION

This application is a national stage application under 35 U.S.C. § 371 of PCT Application No. PCT/US2013/073604, filed on Dec. 6, 2013, which claims priority under 35 U.S.C. § 119(e) upon U.S. Provisional Patent Application No. 61/734,316, entitled "SYSTEM AND METHOD FOR UPLOADING VIDEO FILES" filed on Dec. 6, 2012, by Brian Silvernail, the entire disclosure of which is incorporated herein by reference.

FIELD OF THE INVENTION

The present invention generally relates to a system and method for uploading video files, and more particularly relates to a property video listing system.

SUMMARY OF THE INVENTION

According to one aspect of the present invention, a property video listing system is provided comprising an Internet-connected server configured to: provide a website for receiving a plurality of video files from a user to upload in association with a property listing; upload all of the received video files to a video hosting service while providing identifying data pertaining to the property listing with each uploaded video file; and display the property listing and provide thumbnail photos with links to each of the uploaded video files whereby visitors of the website may view the video files within the property listing. The thumbnail photos and/or MLS photos may be used to automatically render and upload a branded and unbranded slideshow video.

According to another embodiment of the present invention, a property video listing system is provided comprising an Internet-connected server configured to: provide a website displaying property listings and providing thumbnail photos with links to a plurality of video files for each property listing where each thumbnail photo is identified by one of a plurality of different feature designations; track access by visitors of each of the video files; and generate reports of relative interest in each property listing by the visitors as a function of an extent of access by the visitors of the video files associated with each property listing. The server may further automatically render and upload a branded and unbranded slideshow video from the thumbnail photos and/or MLS photos.

According to another embodiment of the present invention, a property video listing system is provided comprising an Internet-connected server configured to: provide a website displaying property listings and providing thumbnail photos with links to a plurality of video files for each property listing where each thumbnail photo is identified by one of a plurality of different feature designations, wherein the feature designations include a summary feature designation and at least one of: kitchen, bedroom, bathroom, living room, and family room; and require that a visitor view the video file that has the summary feature designation before allowing the visitor to view any of the other video files for a property listing. The server may further automatically render and upload a branded and unbranded slideshow video from the thumbnail photos and/or MLS photos.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 2 is a screenshot of an input screen for creating an account within the property video listing system;

FIG. 3 is a screenshot of property listing information as imported from a listing service into the property video listing system;

FIG. 6 is a first screenshot of a manage video screen for managing the videos to be associated with a property listing;

FIG. 7 is a second screenshot of the manage video screen for managing the videos to be associated with a property listing;

FIG. 8 is a screenshot of a property video listing created using the property video listing system;

FIG. 9 is a screenshot of a lead report screen illustrating an exemplary report of leads as generated by the property video listing system;

FIG. 11 is a screenshot of a listing statistics report screen illustrating an exemplary report of listing statistics for the listings of an agent as generated by the property video listing system; and FIG. 12 is a block diagram of a property video listing server used in the embodiments described herein.

DETAILED DESCRIPTION OF THE EMBODIMENTS

Figure 1:
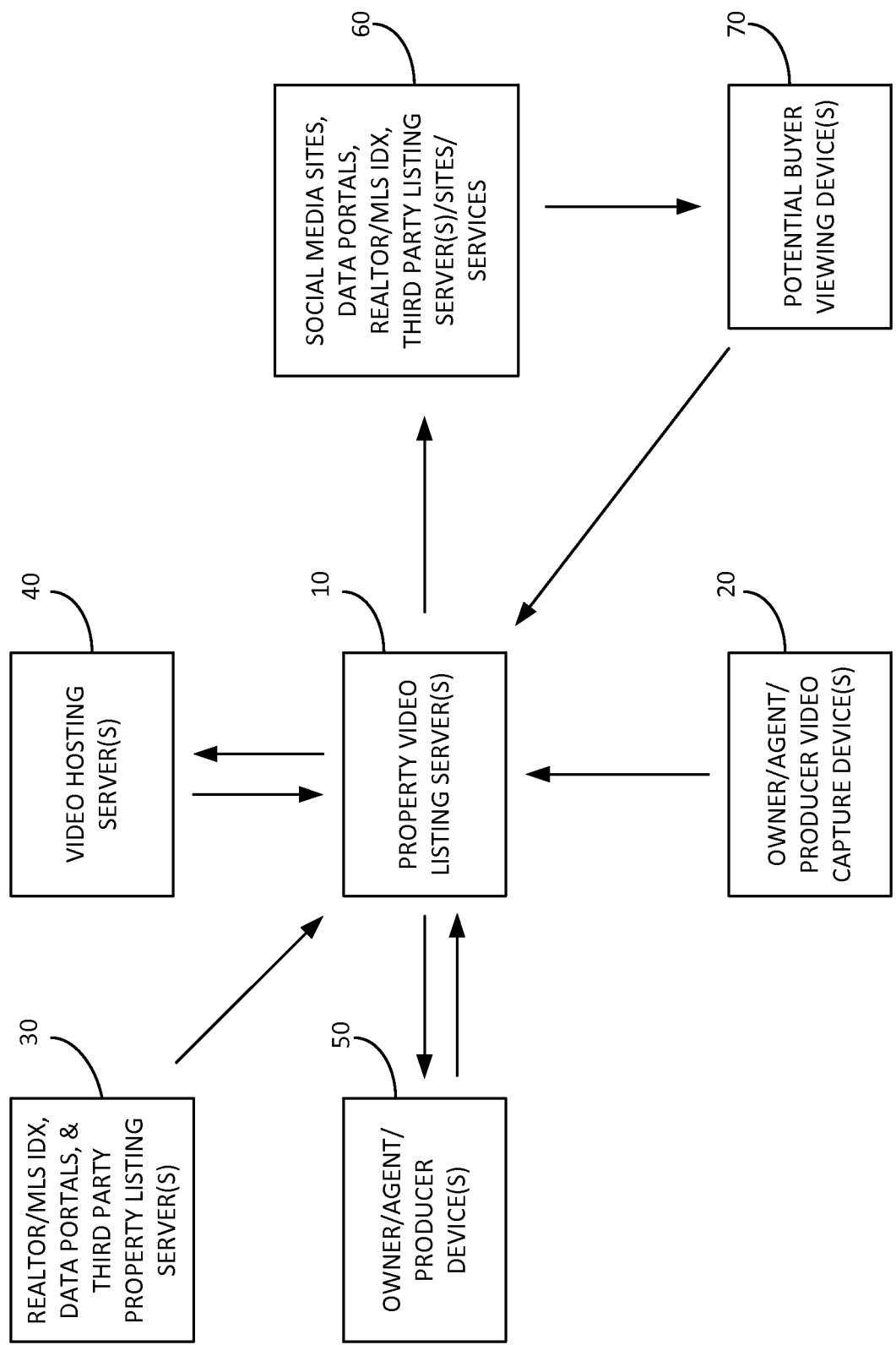
FIG. 1 is a block diagram of a property video listing system according to one embodiment of the present invention.

Reference will now be made in detail to the present preferred embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

In describing the embodiments below, certain terms are first defined below. Such definitions are for purposes of example and should not be construed as limiting the defined terms.

Definitions

"Property" means any real, personal, or intellectual property both tangible and intangible.

"Agent" means any legal person licensed to buy and sell real property and/or unlicensed but otherwise authorized to sell property for others.

"Visitor" means anyone interested in buying property and searching on the Internet to do so, whether a registered member or not.

"Property Video" means a video captured/produced by the agent, video producer, or property owner which is intended to be uploaded using the embodiments of the present invention.

The "unique property page" or "unique property URL" is the uniform resource locator (URL) (i.e., web address) of a webpage which is created on the server's website to hold all video and picture web links, pictures, data, legal documents, and e-brochure which relate to that specific property.

"Media matrix" means all the 'media link URL information' contained on the unique property page collectively, which can collectively be copied and pasted into any html editor for embedded display, and is defined as that property's "media matrix". This media matrix may contain the five URL links of the 1) the unique property URL; 2) the video URLs of each of the videos for the property listing; 3) the digital briefcase link URL which also contains the request for credentials if member is not logged in, or if the visitor is not yet a member, in order for the visitor to gain access to the printed information package, transaction and legal documentation along with an option to set up a personal viewing of the property at the seller's convenience; 4) the URL links to other websites/blogs where the property is listed or otherwise described; and 5) the html embed code of the media matrix or at least that of all the video thumbnails and video player, which allows posting of an image of the video thumbnails with links back to the unique property URL in other websites and blogs. The embed code can be accessed upon clicking an icon displayed within the media matrix. The media matrix may also include a lead capture call to action reporting feature that automatically generates lead reports as well as other reports.

"User" or "User/seller" means a registered user who is using present invention to assist in the sale of the user's property. The user could be either an agent or broker acting for the actual owner of the property or the property owner him or herself or a hired video producer. In the case of a service or person (i.e., a dating service), the user may be a service provider, the person, or an agent for the person.

There are two main embodiments both described herein with respect to FIG. 1 and both pertain to a system for providing property listings having a plurality of viewable video files showing the property for sale, the system is generally referred to herein as a property video listing system. The first embodiment is specifically aimed at a property video listing system that provides a website where agents may sell properties for others. The second embodiment pertains to a property video listing system that provides a website for the property owners themselves, who are selling their own property. Such property may be real or personal, and may be titled (such as a piece of real estate or a car or boat or similar) or untitled (their stamp collection). Although the invention is described below with respect to property and more particularly to the sale of real estate, the invention may broadly be used relative to the sale or rental of all forms of property or of a business and its properties, personalities, brands, the sale of services, and also for dating services and the like.

The two embodiments are primarily described below as web applications as opposed to mobile applications (or "apps") whether for smart phones or tablets. Nevertheless, the present invention is not limited to either form of implementation. Much of the same functionality and processes will apply whether it is the web application or the mobile app that is used. Additional details of how a mobile app may be used are discussed further below.

FIG. 1 shows a system diagram illustrating the interaction amongst the system components of the two embodiments. As shown, a server 10 (or more likely several servers referred herein simply in the singular) is provided that hosts the website and databases used to implement the property video listing system. Server 10 interacts with various computers and web-connected devices. Such devices include the owner/agents' devices 20 and 50, which may include computers, tablets, smart phones, and/or web-enabled video cameras or other imaging devices. Server 10 also connects with various property listing servers 30 such as multiple listing service (MLS) and other third party property listing servers. In addition, server 10 interacts with video hosting servers 40 such as those provided by YouTube®. Server 10 may also interact with other third party components 60 such as third party listing sites (such as the agent's own listing site, other listing sites (Zillow.com®, Trulia®, Craigslist®, etc.), Internet TV ad placement servers, social media sites (Facebook®, Linked-In®, Twitter®, Instagram®, Google+®, Pinterest®, etc.), creative commons, data portals, and IDX feeds. Potential buyers 70 may use their viewing devices such as computers, tablets, and smart phones to view these listings and while doing so may generate video view counts that that may be reported from video hosting servers 40 to server 10 (or otherwise tracked by server 10) such that reports on viewing and interest level in a property listing may be generated by server 10 and pushed out to the agents and their clients (the owners) and optionally to the producers of the videos as well. The manner in which the property video listing system operates will now be described.

The process begins with an agent/owner/producer creating an account and profile from one of their devices 20 by accessing the website hosted by server 10. FIG. 2 shows a sample screenshot of the screen the agent would see when creating an account. As illustrated, the agent would be prompted to input numerous pieces of information including some that is required to create the account. The required information may include first and last name, e-mail address, and a password. Other information that may be input includes the agent's designation, company, address, phone number, specializations, areas served, a description, a photo, any URL of a video advertisement the agent may have created and saved on a video hosting server such as YouTube®, and any URLs of websites or blogs that the agent/owner wishes to link within the media matrix of the property video listing, such as other websites that list or describe the property. The profile input screen may further include prompts for an agent to customize the look of the agent's property listings by prompting the agent to upload a company logo, MLS logo, and/or an agent/team logo as well as to select the two colors (dark and light) to be used by the app's video player for branded video playback and non-branded video playback with player customization on the agent's property listings. The colors may be selected from a displayed palette or a "dropper" may be used whereby a color can be copied from another website, such as the agent's own website. Additional prompts for customizing how automatically rendered summary videos appear may also be provided such as prompts for slates, fonts, and music. Further, the agent/owner may be prompted to customize scheduling parameters of where and when listing notifications may be automatically posted. The input screen may include click boxes for various social media sites. Further the timing of such postings or email broadcasts may be selected as further shown in FIG. 2.

Once the agent has created an account, the agent may create IDX data feed authorization to import their MLS profile that includes their MLS ID and MLS password that allows access to the multi-listing service (MLS) online system 30. Note that for other forms of properties for sale, other third party listing services may be used in place of the MLS online system such as Autotrader® or Match.com®. In addition, the agent may create listings manually or may import listings from a property listing server 30 such as an MLS server or from third party listing sites 60. To import listings, the agent clicks on the "Import Listings" tab shown in their web browser when viewing the website on server 10 (See FIG. 3). Upon doing so, server 10 displays a screen in which the agent is prompted to enter the MLS # of one of their listings. The agent enters one such MLS # and clicks "submit." Thereafter, server 10 connects to MLS server 30 and imports the data associated with that MLS # and displays this on the screen as shown in FIG. 3. As shown in FIG. 3, there is a "This is my Listing!" link for the agent to click for the agent to indicate that this is the agent's listing. Upon clicking on this link, the server 10 displays another screen in which the agent is asked to confirm their identity and to confirm that the listing is theirs. If they confirm this information by clicking on the "submit" button, server 10 responds by showing the screen that the SWMRIC agent profile successfully linked. If desired, the agent may then import all listings from MRL server 30 that are associated with that linked SWMRIC profile. This MLS data is updated to the server 10 database on a daily basis.

Figure 4:
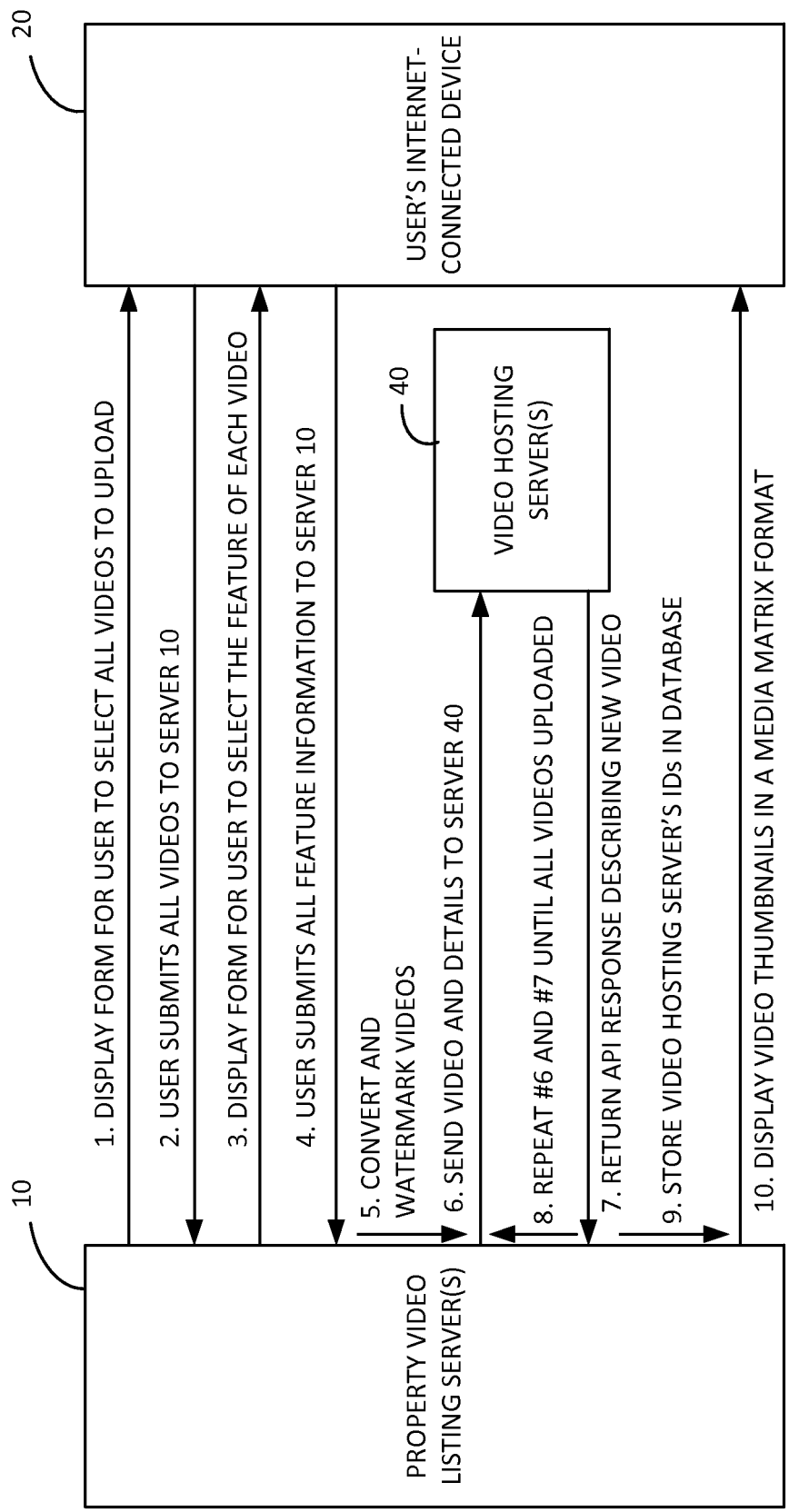
FIG. 4 is a process flow diagram illustrating a process by which videos may be uploaded to a video hosting service used in the embodiments described herein.
Figure 5:
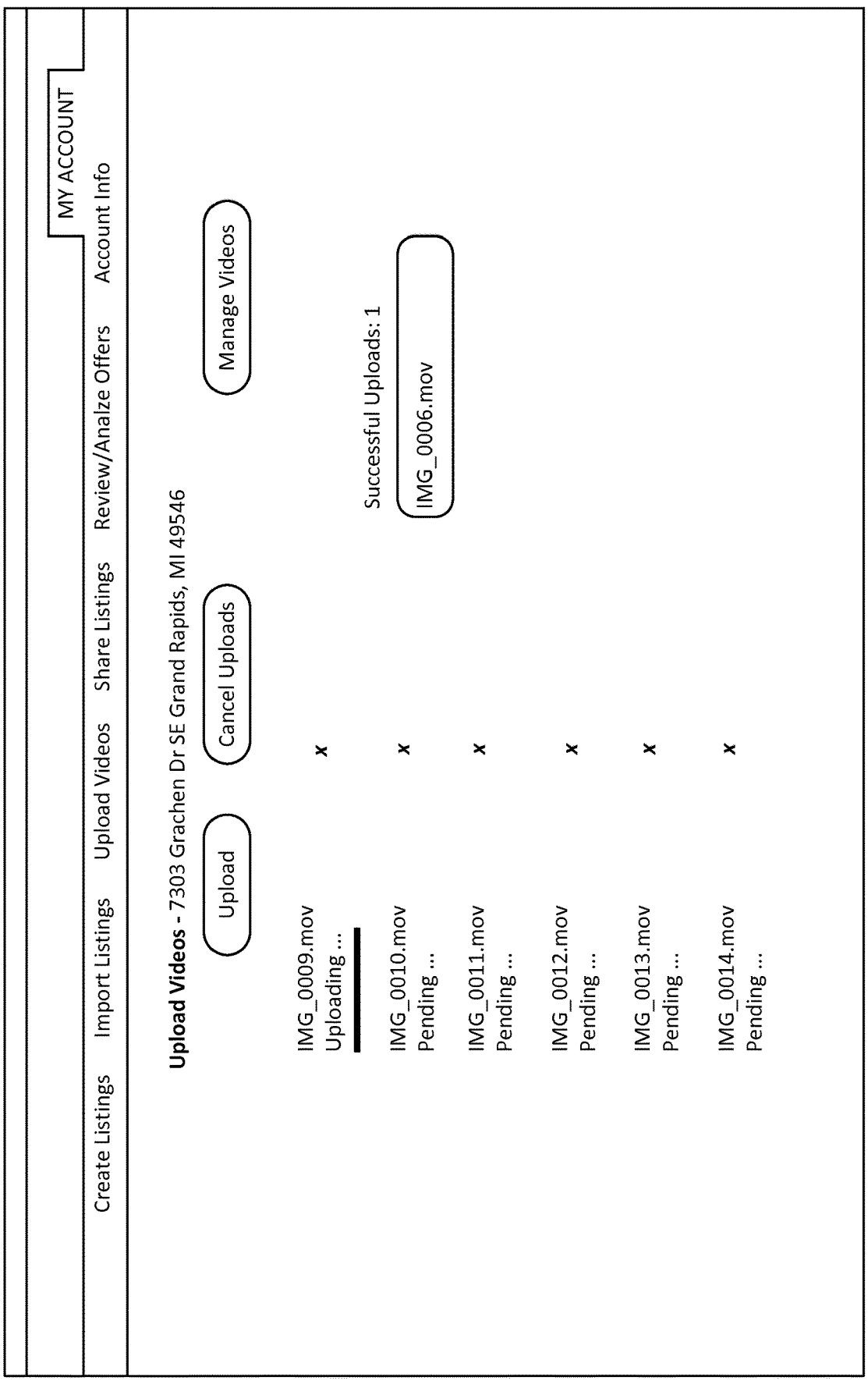
FIG. 5 is a screenshot of an upload video screen for uploading videos for a property listing.

After manually creating or importing a listing, the agent may upload numerous videos of the property. FIG. 4 shows the interaction steps that occur between the server 10, the user's browser on their device 20, and the video hosting server 40 when uploading the videos and thereafter. This may begin by the agent clicking on the "Upload Videos" link on the webpage. The server 10 then displays a hyperlinked list of all of the agent's associated listings and the agent is then shown a form and prompted to select the listings for which videos are to be uploaded. This step is illustrated in FIG. 4 as step 1. Upon selecting a property listing to which the agent wishes to upload videos, the server 10 creates a unique property ID for that property. In response to the selection of a listing, the server then shows the address for the selected property and prompts the agent to click on the "Upload" button. Thereafter, the agent may browse and select video files on the agent's device 20 to be uploaded. Once the user selects the videos to upload, and they are displayed in a list. The user then clicks "Upload" and the videos are then uploaded to the server 10 and the progress is shown as illustrated in FIG. 5. This is last step is represented in FIG. 4 as step 2.

Once all of the videos have been uploaded to the server 10, the server displays a screen showing successful uploading of each video and then displays a form (FIG. 6) to the agent to select the property-related feature shown in each video clip. This is step 3 in FIG. 4. These features may be selected from a pull down list that is provided next to each of the list of file names for the video clips. A thumbnail image is also shown next to the video clip file name. At least some of the feature designations may for example, include (but is not limited to) at least one of the following: summary, kitchen, bedroom, master bedroom, office, bathroom, living room, family room, garage, basement, front exterior, rear exterior, other, etc. If used for commercial real estate, they may include office, loading docks, warehouse, etc. If used for non-real estate, the features may include various characteristics, vantage points, or topics. If "custom" is selected, a blank may be provided for the agent to type in the identifying feature. Preferably, the first video clip to be uploaded is the summary video clip, which provides a brief summary of the property listed for sale. As an alternative to providing and uploading a specific summary video file, a user may opt to have server 10 automatically render a summary video simply by clicking on the "render summary video" button (shown in FIG. 7). The automatically rendered summary video may include a slideshow formed from the thumbnail photos of the feature videos as well as any other alternative photos including those imported from the MLS servers 30 or uploaded by the agent/owner/producer. The slideshow may be set to music and have customized fonts and slates (beginning and ending views) as selected in the user profile input screen. Where thumbnail photos are selected from the feature videos, the feature designations associated with those thumbnail photos may be superimposed on the photos. An example of a screen where all videos have been identified with a feature is shown in FIG. 7.

Once the agent has provided such designations for each video clip and clicks the "submit" button (as indicated in step 4 of FIG. 4), the server 10 thereafter automatically takes various actions without further agent input, including: converting the videos to and appropriate format, such as FLV or mp4, and inserting a watermark identifying the property listing website with a logo and identifying the unique property ID associated with that property, as indicated in step 5 of FIG. 4. The server then communicates with the video hosting service 40 by sending a video file and certain identifying information for upload (as indicated by step 6). As indicated throughout, the video hosting service may be YouTube®; however, other video hosting services may be used. The server 10 is programmed using .php (i.e. open source) programming which communicates and responds to video hosting website's audio and video APIs. At this time, of all video hosting websites, YouTube® has the most advanced and flexible programming within their user API interface technology has allows server 10 to upload, to title, to index, to provide keywords, and to promote videos. If the video hosting service is YouTube®, YouTube's API uploading protocol may be employed in which case the YouTube® server 40 would receive and host the video clips and would send back a return API response (step 7) describing the video as uploaded including a unique URL for subsequent linking and access to the video clip. Among the fields of the YouTube® uploader form which may be automatically populated by server 10 as part of this automated upload process to YouTube® are specifically the following:

i. The property video title;
ii. The property video description and the unique property URL back-links which are within the description as well as individual keywords including geographic regional and hyper local keywords;
iii. The tags;
iv. The licensing (whether a standard YouTube® license or a license which can be re-used);
v. The visibility (i.e. whether public or private);
vi. Qualification of the property video for monetization;
vii. Captures required number of individual thumbnail pictures of each video for content display;
viii. Automated scheduling of video promotions made available with the video hosting service, social media networks, and Internet TV;
ix. Allowing for the automated editing and creation of a summary video of the property from keyword text graphic generation and feature video thumbnails from a combination of matching the 1) keyword text from the data base, and 2) name of the video from which the thumbnails and photos were taken and placing them into an automated video edit decision list that creates the individual video, with (out take content) created and imported from the feature videos;

x. Allowing for the same process as ix. above, except that the video is created from not just thumbnail pictures from the feature videos, but rather full motion video pieces taken from the feature videos; and/or xi. Allowing for the placement of the feature videos as source footage, not just searchable on the Internet for use as source video for editing, but also time code indexed, so as to allow an editor from any location accessing the Internet to import the featured video footage as source footage to create a customized human video production with online editing software, setting the in and out points of video.

As indicated by step 8 in FIG. 4, steps 6 and 7 are then repeated until all of the video files have been uploaded. Once the upload to YouTube® of a property video file is complete, YouTube then processes the video file. The YouTube® server 40 then assigns a specific 11-digit suffix to the YouTube URL of that video file. The server 10 automatically waits for the property video to be processed by YouTube® and for the YouTube 11-digit suffix to be assigned. The server 10 then automatically returns to the YouTube URL (newly updated by YouTube with its 11-digit suffix), copies the 11-digit suffix now applied by YouTube® to the property video file (step 9 of FIG. 4), and imports and stores the YouTube-assigned 11-digit suffix into the administrative area of the agent's account in a database associated with server 10 in association with each of the video feature designations (step 10 of FIG. 4), thereby displaying the clickable URL of that property video. Thus, by clicking any property video URL now placed within the media matrix on the unique property page, the agent or any visitor is able to see and play that property video file from within the server 10 website. By placing the property listing URLs of other websites listing the property in the media matrix, the property video listing website generated by server 10 is optimized for search engines to list the unique property URL at the top of search queries.

When an agent uploads a predetermined number of, for example, seven property video files (summary video, plus six feature videos), then the property becomes visible and is published to the website on server 10, with all the associated tools which are embedded (sharing, reporting, etc.). An example of such a visible listing is shown in FIG. 8. If the agent does not upload the sufficient number of video files, then the property page may not be published. For personal property, as opposed to real or other titled property, the required number of property video files uploaded may be one or two or three, for example.

When a property listing and listing ID is first created/imported (through the action by the agent of selecting a specific property within the properties associated with the agent in the agent's account), that property listing is automatically given a specific web URL by the server 10. This property URL becomes the back-link which is automatically placed by the server 10 into the first line of the description field of the YouTube® uploader form for that video. The description of the video then appears after that.

The server 10 returns to the YouTube® server 40 and imports the YouTube-assigned URL and suffix and places it into the YouTube® playlist. Additionally, server 10 may automatically create a video playlist in the property's unique property page with each of these imported property video URL links, which contain all the uploaded property videos relating to that specific property. The summary video is placed at the top of this property video playlist, with the remainder of the uploaded feature videos appearing in the video playlist either in the order uploaded or as edited by the agent in the agent's account on the website.

The upload process optimizes each property video by placing the appropriate keywords (geographical keywords such as regional (Craigslist) and hyper local (zip code or town) and back-links into the appropriate fields in YouTube® so they can then therefore be found by all the search engines (Google®, Bing®, Yahoo!®, etc.).

In step 10 of FIG. 4, server 10 displays video thumbnails in a media matrix format so the agent/potential buyer can quickly view features of interest (see FIG. 8) using an embedded video player, which may be a YouTube player, flash player, or most preferably an html 5 player that is compatible with most devices. The thumbnail photos of the videos may be arranged in rows and columns and one may vertically scroll using the browser scroll bar to view all the thumbnails. Alternatively, one may scroll through the thumbnails horizontally in a carousel fashion.

As shown in FIG. 6, a user may manage/edit the uploaded videos by changing their sequence or deleting the videos. Thumbnails may be selected/changed and the feature designations may be changed. Further, a user may insert a lead contact form by dragging the "Lead Contact Form" between videos in the sequenced listing. This causes a pop-up form to pop up between playing of the videos it is positioned between. The form prompts the visitor for contact information, such as name, email address, phone number, address, etc. An unregistered user would not be permitted to view the next video until the form is completed. A registered user would not be prompted with the pop-up lead contact form. The significance of the positioning of the lead contact form is that it establishes a predetermined (i.e., user-defined) number of videos that a visitor must view before being counted as a lead or warm lead. The location in the video sequence for the lead capture form is most often placed immediately after a video ending with a narrative or graphics inviting the prospect to take the entire video walk-through of the property. Once the form is completed or an already registered visitor views the next video, a lead is captured and counted for subsequent reporting to the agent or owner.

The media matrix contains five primary elements (embedded URL links) so as to create uniformity in future reporting and analysis, which the media link displays are customizable. The media matrix is at the root five individual URL link addresses which are embedded within a customizable html display code graphic user interface (GUI) that allows the html code of the media matrix to be embedded by pasting the html display code into any html editor made available on listing sites, social media sites and Internet TV advertising displays, creating regional and hyper local search engine optimization on the web, social media sites, video hosting services, and Internet TV programming schedules currently available as well as those of the future.

The media matrix and media can be shared by using the media matrix display, which allows server 10 to automatically present in one page or alternatively a small embedded html page, concisely all property information which a visitor requires to be best informed about that property. The media matrix also serves as an html code generator, which code can be copied and pasted into other html text fields of listing services. The code can also be copied into social media sites provided they allow html picture posts instead of just the text posts. This allows almost everything to go free of text, unless it is explanatory, or part of the html GUI text instructions or labels so that it becomes one simple copy and paste code as customized by the user. However, rather than just taking a URL and sharing it with text with everyone so that one has to click on that URL from the social media site, the properties media matrix display of 10+ individual links can be copied and pasted into an html text display form for any website and thereby transfer all the display information and links for that property directly to the post.

The video playlist is displayed on the unique property page (see FIG. 8) and is able to be played within the property page.

The uploader automatically creates and populates the media matrix display with all text, pictures, and links to documents and videos in a particular order, namely, first, the summary video, and then the remaining feature videos, in the order in which they were uploaded to YouTube®.

Three or more photographs from each uploaded property video—whether the summary video or a feature video—may then be automatically captured from the video and imported into the server 10 database and posted to the unique property page on website. The thumbnail photos may also be manually selected by the owner/agent or imported from their MLS IDX. These same three or more photographs are also and automatically populated into the property marketing brochure (available in the digital briefcase, which is discussed below) as a specific part of the upload process. This addition of these photographs into the property brochure, which was hereunto without photographs, then completes this property brochure. The basic property information (e.g. its address, property ID, numbers of rooms, price etc.) may already be automatically imported into the appropriate fields of the following documents: the property's marketing brochure; a qualified Buy-Sell contract document; and a Disclosure Statement. Such basic property information may be automatically imported into these documents when the property is first imported into the server 10 from the local MLS servers 30. For rentals, a standard lease document may be automatically populated and made available for visitors to review. The brochure and documents may be provided on a webpage referred to herein as the "digital briefcase." Users also have the ability to go back and edit, delete, change or update all text, photos, thumbnails, media links, logos, color choices, and the order of their presentation from their user profile interface under edit. Such editing may also occur under a "manage videos" menu, which generates a screen such as that shown in FIG. 7, for example.

For visibility and publication on the website, the property brochure preferably is populated by a minimum of 12 photographs, representing a minimum of two photographs from six videos (in relation to the sale of personal, as opposed to real or other titled, property, the number of required videos may be three videos or less, with the number of uploaded photographs thereby reduced accordingly). These photos may be the ones used to automatically render the summary video, along with those uploaded by the owner/agent/producer as well as those imported from the MLS.

For clarity, the property brochure is a document summarizing all the elements of the property being displayed for sale. Before it is populated with property information and photographs, this brochure is a printable and downloadable pdf template file resident on the website. It is automatically populated with the property's unique information (text and photographs). This pdf template is populated automatically from two sources: for text, with information taken from the local MLS resident on the server 10 database when the agent associates an MLS property with server 10 (or other third party listing service); and for photographs, as a process within the upload process, with three or more photographs taken from each feature video uploaded to YouTube®. The agent also has the ability to upload additional photographs both onto the property's unique property page on the website and into the property's brochure. The agent also has the ability to upload into the property's digital briefcase, additional documents relevant to the property, e.g. title information, as exchanged over the ftp: protocol file server system. This makes all documents available, downloadable and printable from all computers and mobile devices with print capabilities in the pdf format, thus insuring access to all necessary documentation in a quickly downloadable format useable by all, survey report, appraisal, inspections, environmental survey, etc.

Photo stills from the property videos may be used to automatically add photographs both to the property's unique property page on the website as well as to the property brochure. The purpose of the digital briefcase is to facilitate interest in the property, and to allow both the agent and visitors to print this property marketing brochure and any other purchase documents relevant to or required by possible purchase of the property as well as to schedule open houses and show the dates of the open houses to interested visitors.

Video time code indexing may be utilized for locating not just the video, but the specific frames (according to time code) of an open source or shared content video that a video producer or video editor in one location finds, accesses and then literally grabs the selected time code frames of a video for editing processes in the future. This will most likely start with the further development of online editing software in which all of the code and content stay on the web at all times, first in a lower resolution version for initial editing so that the source footage does not have to be downloaded in its entirety for the creation of an edit decision list by the editing software, but will be able to go back and access the exact frames again when the editors chooses to render the newly created video using this "open domain" video source footage, whether available for free, or at cost, it all needs to be uploaded, optimized for location via search, and then time code indexed for recall for online editing applications and their rendering processes.

Furthermore, by displaying the property videos and media pieces categorized and in the order in which they are displayed, the server 10 is able, automatically, to present concisely all property information which a visitor requires to be best informed about that property.

As part of the cascade of processes taking place when video is uploaded using the above described process, the unique property URL is shared, at a scheduled time, with a variety of social media sites into a user's account on that site (using the user's name and password, which the user has set up in their profile). Obtaining the unique property URL and also the video URLs of the videos uploaded to YouTube® is the one of the steps described above. Once these video URLs have been gathered from the YouTube® servers 40 and placed into the unique property page, then the unique property URL link, created by the media matrix, is automatically shared into other websites. Examples of some of the websites into which the unique property URL may be automatically shared are Facebook®, Twitter®, Pinterest®, Linked-In®, Google+®, Instagram®, and Blogger®. Users can choose whether they share with all or just some of these websites, or broadcast email lists the user maintains or purchases in their email system such as gmail or Outlook®, and when they should do so for the life of the listing (for example, three to six months).

The basis for sharing is either the exporting of the unique property URL (which has been created for and assigned to each specific property listed on the website) or the exporting of the specific video URL of the summary video of that property. Whether it is the unique property URL or the specific video URL of the summary video depends on the website to which it is being exported.

For example, for social media sites, such as Facebook®, or a blog site such as Blogger®, the unique property URL is automatically entered into the status update field (for a social media site) or a post field (for a blog site) along with a title and a short text description summarizing the property. The options for what this text shall consist of are chosen by the agent when defining user profile options in the agent's user profile. These user options also offers the choice to select a random function which allows the short text description to be randomly made up of different key words and in different sentence formats so as to look as if the automated export and the describing texts have been personally typed by the agent rather than through an automated process. This makes the exporting, which may be repetitious and frequent, to appear personalized for each specific export which is exported.

For property listing services, such as the local MLS, the unique property URL is exported to the MLS's database into the specific field recognized by the MLS database as the virtual tour link for that same property. This is done automatically because, again, the agent has, in the agent's user profile, entered the agent's user name and password for the MLS site and the MLS number for that property, thus allowing this automated export to occur.

For Internet television, the specific URL of the property's summary video is transmitted to the Internet television's API and added to the program's commercial playlist or program list on that Internet television site which it has taken from the property's unique property page so as to allow the summary video to be played automatically as a commercial. Of note, since the summary video is being viewed on Internet television, if a visitor chooses to click the summary video while it is being played, the visitor is directed away from the Internet television site and is re-directed to server 10 website's unique property page for that property.

This is done for the TV network, in a manner that does not leave the Internet TV network's primary Internet TV display page screen for that program on the TV network. When the appointed time slot within the playlist of the online TV program comes, the Internet TV display opens up the video within their display screen while keeping the TV site's display in place at all times or literally has the listing advertisement open in a separate smaller window from which the user can expand the sizing of the player. When the video or playlist of videos is completed playing or if at any time the user exits out of the window, the user remains in the "commercial break" mode, which allows for one to three inserted videos between program segments, similarly spaced as they often are for network television advertisements to be dropped in. All of this used to be done with video tapes and then DVDs, now it may all be automatically stored and recalled from the Internet on demand and as scheduled, which is why the uploader is so advantageous in this process of automation to instantly process the upload and complete all the keywords, backlink, description and tags. In other words, server 10 is not just linking to a property page, but a media matrix, which not only works for properties but also for the uploading and indexing of advertisements for products, people, places, things and ideas.

The scheduling of these sharings or exports to these various websites (whether social media sites, property listing service sites, or Internet television sites) is determined according to the settings the agent has established on the agent's user profile. When, how frequently, and how the automated sharing takes place is driven by the settings which, again, the agent has defined in the agent's user profile.

Additionally, whether an export has been scheduled or not by the agent, both the agent and any visitor can share/export the property's unique property URL "on demand" to a social media or other website, whether the export has been scheduled or not by the agent in the agent's user profile. For clarity, when a visitor sees the property page and would like to share its URL with a friend via e-mail or export the URL to the visitor's own, additional social media or other websites, the visitor can do this on demand by clicking the "share" feature. If the user is a registered user, the username and passwords of the sites of which the user is a member will allow this sharing to be automated, without requiring the user to enter the user name and password specific to the destination website.

As mentioned above, there are two embodiments described herein, where the first embodiment was primarily intended for agents to post their listings and add multiple videos of the property for each listing, and the second embodiment is primarily intended at individuals wishing to post a for sale by owner (FSBO) property listing. The components of the second embodiment are generally the same as those described above with respect to the first embodiment. One difference is that the second embodiment does not interface with MLS servers as individuals generally do not have listings on an MLS server, and thus the second embodiment would not include realtor/MLS property listing server(s) 30.

Part of the server 10 programming allows for the agent or owner to upload into their user profile either an individual name and e-mail address or a database file of names and e-mail addresses. A group of names and e-mail addresses can be labeled as an e-mail group list (examples: "Clients from 2011," or "Hot Prospects").

The agent or owner may then click a link "Share via E-mail" and select to whom they would like to send the e-mail, whether an individual or an e-mail group list. The server 10 then automatically creates and populates an e-mail template, including in the message field the unique property URL and an image and a shortened version of the text resident in the media matrix on the property's unique property page. The agent or owner can then add their own custom text into any field within the e-mail, enter a subject into the subject field, and then hit send. This allows for anyone who would otherwise fall through the cracks to receive an e-mail from the agent or owner.

Through the visitor counts and the property video viewing counts made automatically by the server 10, the data is then used to automatically populate reports which are automatically made available to the agent and, if the preference of the agent, to the property owner. Default would be to report to the owner automatically unless the agent selects otherwise. When creating a listing, an input screen is provided for the agent to input the owner's e-mail address. These reports are accessible in the agent's and, if established, in the property owner's, respective accounts on the server 10 website and can be viewed there. In addition, the reports are automatically e-mailed to the agent (and, if the agent wishes, to the agent's property-owning client) on a regular basis from daily to bi-weekly with the default for residential properties being every three days and for commercial properties every seven days.

This reporting serves to (a) provide an understanding of the level of interest by visitors in a property and (b) automatically inform both agent and owner of such.

Following the property video upload process and the importing of the property data into the server 10 database, and as interaction by visitors takes place at each unique property page on the server 10 website with visitors watching some or all of the property's videos, visitor leads are generated (along with the visitor leads' unique identifying contact information) as well as quantifiable and real reporting data which can be gleaned both from the visitor counts and the visitor viewing counts which are captured by the server 10. All this information is automatically e-mailed to the owner or agent (according to a pre-determined schedule which the agent has established in the agent's user profile preferences, including whether these should be also sent to the agent's property-owning client) and can also be viewed online. The data is automatically gathered by the server 10. It is then automatically presented in two ways: in real time and/or in scheduled releases.

If a visitor, whether registered or anonymous, either requests to view the property's digital briefcase or requests an in-person showing of the property, that visitor is then identified as a lead. Until a visitor does so, the visitor is recognized anonymously in the counters for whichever property videos the visitor views. Anonymous visitors—i.e. visitors who arrive at the property's unique property page and watch videos but do not log in, nor become a registered user, nor provide their identifying information—will also be counted and their visiting and viewing behavior entered into the server 10 database and reporting. This will also provide a quantifiable measure of anonymous interest in a property, including repeat visits and repeat video viewings by anonymous visitors, which is information which can also be communicated to both the agent and, if the agent wishes, to the agent's property-owning client.

Lead notification reports may be delivered in real time (i.e. when a report-worthy event occurs). For example, if an anonymous visitor or a registered user views either all of a property's videos or a high number of a property's videos (that is, a percentage of the property's videos as determined by the owner or agent in the agent's user profile preferences, for example 50% of all property videos) or a high number of views of one particular video (again, the "high number" being determined by the owner or agent in their user profile preferences), then an e-mail is automatically sent to the owner or agent (and, if the agent wishes, to the agent's property-owning client) in real time to notify the agent of this event, and, where this is possible, the e-mail automatically includes the unique identifying contact information of the anonymous visitor or the registered user viewing the property. In the case of the anonymous visitor, the e-mail will detail that this viewing event has occurred. In the case of a registered user, then the e-mail will also detail the unique identifying contact information of that registered user.

In addition, the server 10 may also automatically e-mail the agent (and, if the agent wishes, to the agent's property-owning client) in real time with the unique identifying contact information of the visitor or the registered user if one or more of the following events takes place: a registered user requests to view the property's digital briefcase or an anonymous visitor to the property page shares the property, for example, with a friend, or to their social networking site (to do this, they will have had to include their e-mail address in order to share, and thus their visitor anonymity is broken). In both these two cases, the owner or agent (and, if the agent wishes, to the agent's property-owning client) is automatically e-mailed a lead notification.

Figure 10:
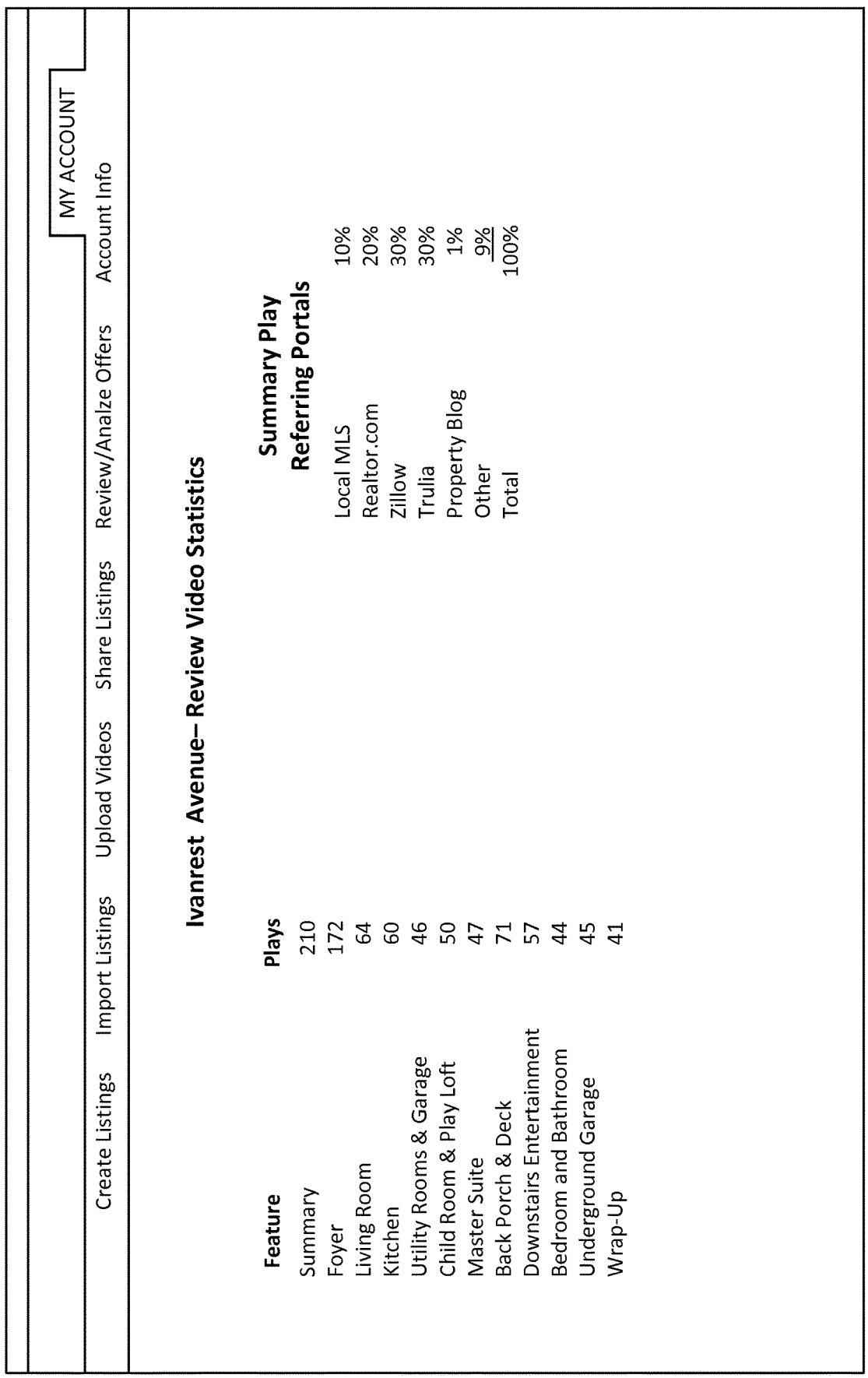
FIG. 10 is a screenshot of a video statistics report screen illustrating an exemplary report of viewings of the videos associated with a property listing as generated by the property video listing system.

As noted above, the reports may be a scheduled report release (time and frequency is determined by the agent, but, once set, is automated by the server 10). The server 10 may automatically create visitor reports and visitor viewing reports. These are created automatically in real time. They are both available for viewing in the agent's review and analyze page and are also sent via an automated e-mail to the agent (and, if the agent wishes, the agent's property-owning client), the frequency of which the agent has established in the agent's user profile preferences. These automated e-mail advices, or notifications, can be in real time, hourly, daily, weekly, or monthly, depending on the preferences established by the agent. An example of the information shown in such an e-mailed status report is shown in FIG. 11. Examples of such reports accessible from the server 10 website are shown in FIGS. 9-11. The lead listing report shown in FIG. 9 may be accessed by clicking on the hyperlinks for leads as shown in the report of FIG. 11. Likewise, the video review statistics report of FIG. 10 may be accessed by clicking on the hyperlinks for feature plays as shown in the report of FIG. 11. In the reports, the video counts may be generated from the embedded video player rather than the video hosting servers 40 (such as YouTube® since current video hosting services often do not count views correctly for autoplays and playlists created by their uploader or API, and will often only generate one count when an entire playlist of videos are viewed in their player sequence. The server 10 thus preferably counts a video as having been viewed if the visitor begins viewing the video and is later verified to be still viewing the video for a predetermined time period of, 10-15 seconds, for example. In the reports which are available in this way, whether e-mailed or viewed online or both, the information may include any one or more of the following:

a. Unique Visitor Count. Each time a unique property page is visited by a visitor (i.e. a visitor or an already-registered user), the server 10 database counts it as an individual visitor (i.e. a visitor looking at the unique property page of that property). For clarity, this is not a record of how many times any one visitor visits the property's landing page, but rather a record of how many different individual visitors see that same page. In effect, it is a tally of how many individual IP addresses arrive at the unique property page, and if an IP address visits more than once, the server 10 still only counts it as one visitor.

b. Summary Video Count. When a visitor clicks on the property video playlist resident on that unique property page (this playlist is the summary video followed by a series of the property's feature videos), the count referencing the summary video is increased by one. When someone lands on the property page, the summary video is automatically played and a count is generated if the visitor watches the summary video for more than a predetermined time of 10-15 seconds, for example.

c. Feature Video Count. If a visitor then continues to watch any subsequent feature video in the playlist (whether that feature video is consecutive to the summary video or not), a count is taken of the number of visitors who continued on and watched at least one feature video in addition to the summary video. Once the summary video auto plays, it is possible to have each of the feature videos sequentially auto play in order and thus, a feature video count is generated for a particular feature video when a visitor watches the video for more than a predetermined time of 10-15 seconds, for example. Note that advertisements and lead capture forms can be run between the auto playing feature videos so as to generate more revenue for the website operator.

d. A count may also be tallied of how many visitors watch each individual feature video. For clarity, data is automatically captured which informs the agent how many visitors watched more than just the summary video, and how many watched which particular feature video.

e. When a visitor registers with the server 10 website, the visitor leaves the anonymous count and the visitor's property video viewing habits—i.e. which videos the visitor has watched, how often—are then transferred. At this point, the visitor is then recognized as a lead and is no longer considered an anonymous visitor. The reports then reflect this change and are automatically adjusted.

f. Lead Generation Count. When a visitor requests to view the property's digital briefcase, continues on to view feature videos in the video sequence past the inserted lead capture form, or requests an in-person showing, the server 10 takes the visitor to a web form or webpage where the visitor is then asked either to log in (as an existing registered user) or to complete a form to become a registered user or to complete a form in which the visitor must provide the visitor's unique identifying contact information. At the same time as the visitor's request to view the property's digital briefcase, the visitor is also able to request and schedule an in-person showing to visit the property in person.

g. Whenever a visitor requests to access the digital briefcase or requests a showing, the server 10 tallies this visitor's interest as a unique lead (as opposed to an anonymous lead) and it is then added to the lead generation count for that property. As described above (and according to the scheduling determined by the agent), this lead generation event is then automatically e-mailed to the agent (and, if the agent wishes, to the agent's property-owning client), with the e-mail automatically including the unique identifying contact information of the visitor.

h. If the visitor is already a registered user or requests to access the digital briefcase (which requires the visitor first to register as a user), the visitor is then permitted access to the property's briefcase page. Here, the visitor is able to view and download property documentation associated with the property and to select which property documents the visitor wishes to view and/or to download. These property documents may include the property brochure, a qualified Buy-Sell contract document, and a Disclosure Statement. All three of these documents have been automatically created by the server 10 and have been populated with the property's basic details. (See above for how and when this occurs during video upload.) The owner or agent may upload manually any number of additional documents into their property's briefcase page via the administration page connected to that property, including the three property documents that the server 10 automatically creates and makes available in this way (the property brochure, the Buy-Sell contract, and the Disclosure Statement).

i. Warm leads. These are the number of visitors that viewed a predetermined number of videos but did not register. This visitor could also be identified as a warm lead if the individual IP address of the visitor has watched more than 50% of the videos for the listing.

j. The reports may also report on which referring websites that refer the visitor to the website are responsible for generating the most leads and/or warm leads.

k. A listing of referring websites/portals (FIG. 10) which lists all referring websites/portals and the percentages of views that are attributable to each referring website/portal.

The visitor is also given an option to request and to schedule an in-person viewing of the property or request a conference call. The server 10 database automatically captures this in-person meeting request and then automatically reports it, along with the visitor's unique identifying information, to the owner or agent and, if the agent wishes, to the agent's property-owning client in real time. The purpose of this is to (a) measure visitor interest [note: this is not just visitor activity] and (b) to generate in-person meetings with interested (and presumably motivated) buyers.

With real statistical data gathered from a wide number of properties listed on server 10 website, there will also be many other analytics available which can compare one property against an aggregate of other properties—by price, by location, by numbers of bedrooms, etc.

Server 10 is configured to display input screens that prompts the user to perform a series of steps. The first step is to select a property type (i.e., real estate, personal, intellectual, etc.) If, for example, a user selects "real estate," server 10 displays an input screen in which the user is prompted for a type of transaction (i.e., residential sale or lease) and is provided with an input form uniquely tailored to that particular type of property and transaction. If, for example, a user selects "personal," as the type of property, server 10 displays an input screen in which the user is provided with a pull-down list of various categories of personal property. These categories may correspond to the categories provided on a listing service website such as Craigslist®, for example. The user is also prompted for a type of transaction (i.e., sale or rental) and is provided with an input form uniquely tailored to that particular type of property and transaction. Similar input screens may be provided for intellectual property, services, job offerings, help wanted, dating, and other things that are offered on the Internet.

The server 10 website may further include an auction module that provides an option for sellers to put a listed property up for auction. Such auction options may provide an additional source of revenue for the website operator. The auction component may allow the owner to input the parameters for the auction such as the minimum bid and length of the auction.

The server 10 website may also allow users to set up a producer's account. A producer is someone who would produce videos and upload them to the website on behalf of an owner. Thus, a user could select "create producer account." Upon selecting this option, the user would then fill out various fields to create a producer account and would enter a user name and password. Upon submitting this information, a display screen would be shown that directs the user to check their e-mail inbox for an e-mail including an activation link. The user would then click the activation link in the e-mail to activate the user's account.

Once the account has been created and activated, the producer may find owners or agents that have listings that may need to have videos produced and uploaded. The producer may view a list of all owners on the site, a list of owners requesting help of a producer, or a list of owners having listings with one or no videos. Once a producer selects an owner, an approval process is required whereby an e-mail is sent to the owner. The owner is requested in the e-mail to click on a link to confirm the requesting producer as a producer that has limited access to the owner's account.

After being confirmed as a producer for an owner, the producer may then log in as the owner. The producer may then upload videos in the same manner as the owner discussed above and may subsequently click a link to go back to a producer options page that allows the producer to find other owners.

The listings on server 10 website or at least the information from the listings and the videos may be uploaded to various "template" websites, such as Zillow.com®. Template websites may be geographically limited (i.e., Washington, D.C. area real estate, Arlington, Va. real estate, etc.), project limited (i.e., a condo project or residential development), feature limited (i.e., waterfront, multi-acre, etc.), agency limited (i.e., the website of a real estate agency), or even niche limited (foreclosures, etc.). These websites increase exposure to the listings to those who are interested in those geographical listings, feature listings, and/or niche listings. In addition, the videos and other information and keywords uploaded to template websites may also be configured for search engine optimization. Search engine optimization gives greater weight to videos and therefore providing URL links named, for example, "waterfrontproperty," in the descriptor fields for the videos, tends to optimize the template website(s) for search engines. By placing the property listing URLs of these template websites in the media matrix, the property video listing website generated by server 10 is optimized for search engines to list the primary domain address and the unique property URL at the top of search queries for the relevant keywords.

In the embodiments described above, the agent, owners, and potential buyers access the server 10 website via a browser. However, it is also possible to use a mobile device or PC running an app. By using a smart phone or tablet and a smart device app, the server 10 may send the video files directly to the server 10 and not to, or through, a PC and then to the video hosting service. The mobile app may be configured such that the user selects a property listing and designates the feature designation right before or right after capturing the video so that the user may subsequently, on a PC or on the smart phone or tablet, access the manage video screen where the videos have already been uploaded and identified with feature designations. The mobile apps will operate different in that they may give the user instructions of how/where to shoot the series of videos with the device-resident app on their smart device, preview, name and approve, or delete and re-shoot, literally while the user is using the device-resident app and allow the videos to be uploaded on the fly with access to WIFI, and directly over cellular service as well.

It is also possible that the videos to be uploaded are stored elsewhere other than on a local hard drive, such as on another website.

The system allows agents to upload company, team and MLS logos and the server 10 is coded to enable the recognition of a referring site, and determine if the referred viewer is viewing the videos from an MLS site, and then play the videos through a non-branded video player. If the referring site was a non-MLS site, then server 10 will play the videos back in the branded version of the video player.

As also noted above, the embodiments may be used for the sale of real property. However, the embodiments may be used in whole or in part for the sale of personal property, intellectual property, or for the sale of services, or for real or personal property rentals. For example, the property may a car and the listing services are either Autotrader®, Craigslist® or both. The listings created may be shared and thereby automatically pushed to various other sites, including Facebook®, Ebay®, Google Plus®, Twitter®, Pinterest®, Linked-In®, etc.

Methods for operating a property video listing system are described above as being implemented by server 10. As shown in FIG. 12, server 10 may include a processor 100, an internet gateway 101, and a non-transitory tangible computer readable medium 102, such as random access memory accessible by processor 100 or such as local memory of a smart phone or tablet on which the above-noted mobile app is resident. These methods may be implemented by software routines executed by any processor, and thus these methods may be embodied in non-transitory tangible computer readable medium 102 having stored thereon software instructions that, when executed by processor 100, cause the processor to generate an Internet website functioning as a property video listing system, by executing the steps of the method described above. In other words, aspects of the inventive methods may be achieved by software stored on a non-transitory tangible computer readable medium or software modifications or updates to existing software residing in a non-transitory tangible computer readable medium.

Thus, the present invention may be embodied as a non-transitory tangible computer readable medium having stored thereon software instructions that, when executed by a processor, cause the processor to generate an Internet website functioning as a property video listing system, by executing the steps comprising: providing a website for receiving a plurality of video files from a user to upload in association with a property listing; uploading all of the received video files to a video hosting service while providing identifying data pertaining to the property listing with each uploaded video file; and displaying the property listing and provide thumbnail photos with links to each of the uploaded video files whereby visitors of the website may view the video files within the property listing. Additional alternative steps may include any one or more of: prompting a person supplying the video files to said server to identify each of the video files by at least one of the following feature designations: summary, kitchen, bedroom, bathroom, living room, and family room; identifying each of the thumbnail photos with the feature designations; tracking access by visitors of each of the video files; generating a report of relative interest in the property by the visitors as a function of an extent of access by the visitors of the video files; converting the received video files to an appropriate format for the video hosting service before uploading the video files to the video hosting service; inserting a watermark into the converted video files identifying the property listing website; receiving a response from the video hosting service including a unique URL for each uploaded video file, store the unique URL in a database associated with that video file, and using the unique URL to create the thumbnail photos that link to the associated video files; prompting the user for MLS ID and password, and downloading information pertaining to at least one property listing associated with the user from an MLS property listing service; and receiving the plurality of video files from the user at the same time and then upload the video files one at a time to the video hosting service without further interaction with the user. The identifying data provided from the server to the video hosting service may include at least one of: a unique property ID for the property listing for which the video files are to be associated; an address of the listed property; feature designations; a URL for the property listing; and a description of content of the video file.

According to another embodiment, the present invention may be embodied as a non-transitory tangible computer readable medium having stored thereon software instructions that, when executed by a processor, cause the processor to generate an Internet website functioning as a property video listing system, by executing the steps comprising: providing a website displaying property listings and providing thumbnail photos with links to a plurality of video files for each property listing where each thumbnail photo is identified by one of a plurality of different feature designations; tracking access by visitors of each of the video files; and generating reports of relative interest in each property listing by the visitors as a function of an extent of access by the visitors of the video files associated with each property listing. Additional alternative steps may include any one or more of: only allowing access to a visitor of a video file that has a summary feature designation unless the visitor registers by creating a user profile including contact information; requiring that a visitor view the video file that has the summary feature designation before allowing the visitor to view any of the other video files for a property listing; identifying a visitor as a lead relative to a property listing if the visitor has viewed video files in addition to the video file that has the summary feature designation, and generate a report identifying a lead including contact information for the lead; automatically generating and transmitting the report identifying a lead if that visitor views a predetermined number of the video files for the property listing; determining relative interest in a property listing by a visitor by a number of video files that the visitor has viewed for the property listing; creating a digital briefcase including documents pertaining to a property listing, wherein such documents are automatically created and populated with information pertaining to the listed property, wherein the digital briefcase is made accessible through the property listing; and identifying visitors who access the digital briefcase for a property listing as lead. The predetermined number of video files viewed to constitute a lead may be set for a particular property listing by an agent or owner by inserting the lead generation form into the sequenced listing of videos just after the predetermined number video files. At least some of the feature designations may include a summary feature designation and at least one of: kitchen, bedroom, bathroom, living room, and family room. For a property listing, at least one of the reports may include at least one of: a unique visitor count, a summary video count, a feature video count, a lead generation count, and a warm lead count.

According to another embodiment, the present invention may be embodied as a non-transitory tangible computer readable medium having stored thereon software instructions that, when executed by a processor, cause the processor to generate an Internet website functioning as a property video listing system, by executing the steps comprising: providing a website displaying property listings and providing thumbnail photos with links to a plurality of video files for each property listing where each thumbnail photo is identified by one of a plurality of different feature designations, wherein at least some of the feature designations include a summary feature designation and at least one of: kitchen, bedroom, bathroom, living room, and family room; and requiring that a visitor view the video file that has the summary feature designation before allowing the visitor to view any of the other video files for a property listing. An additional alternative step may include: only allowing access to a visitor of a video file that has a summary feature designation unless the visitor registers by creating a user profile including contact information. Other feature designations may be provided such as garage, loading docks, office, warehouse, etc.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A property video listing system comprising:
an Internet-connected property listing server having a processor configured to:
provide a website for receiving a plurality of video files from a remote user device through the Internet to upload in association with a property listing viewable on the website;
upload all of the received video files as separate video files to a video hosting server through the Internet while providing identifying data pertaining to the property listing with each uploaded video file; and
display the property listing on the website and provide thumbnail photos with links to each of the uploaded video files stored on the video hosting server whereby a visitor having a visitor device remote from the property listing server may visit the website through the Internet and view the video files stored on the video hosting server within the property listing using the visitor device,
wherein, after uploading all of the received video files to the video hosting server, said property listing server is further configured to receive a response from the video hosting server including a unique URL for each uploaded video file identifying the storage location on the video hosting server of the video file, store the unique URL in a database associated with that video file, and create links from the thumbnail photos to the video files associated with the unique URLs.

2. The property video listing system of claim 1, wherein said property listing server is further configured to:
prompt a person supplying the video files to said property listing server to identify a first one of the video files by a summary feature designation and to identify the other video files by at least one of the following feature designations: kitchen, bedroom, bathroom, living room, and family room; and
identify each of the thumbnail photos with the feature designations.

3. The property video listing system of claim 2, wherein said property listing server is further configured to:
track access by visitors of each of the video files; and
generate a report of relative interest in the property by the visitors as a function of an extent of access by the visitors of the video files.

4. The property video listing system of claim 1, wherein the identifying data provided from said property listing server to the video hosting server includes at least one of: a unique property ID for the property listing for which the video files are to be associated; an address of the listed property; feature designations; a URL for the property listing; and a description of content of the video file.

5. The property video listing system of claim 1, wherein said property listing server converts the received video files to an appropriate format for the video hosting service before uploading the video files to the video hosting service.

6. The property video listing system of claim 5, wherein said property listing server inserts a watermark into the converted video files identifying the property listing website.

7. The property video listing system of claim 1, wherein said property listing server is further configured to prompt the user for MLS ID and password, and download information pertaining to at least one property listing associated with the user from an MLS property listing server that is coupled to the property listing server through the Internet.

8. The property video listing system of claim 1, wherein said property listing server is configured to receive the plurality of video files from the user at the same time and then upload the video files one at a time to the video hosting service without further interaction with the user.

9. A property video listing system comprising:
an Internet-connected property listing server having a processor configured to:
provide a website displaying property listings and providing thumbnail photos for the property listings where each of the thumbnail photos having a link to a corresponding one of a plurality of video files for each property listing wherein the plurality of video files are stored on a video hosting server in communication with the property listing server through the Internet, where each thumbnail photo is identified by one of a plurality of different feature designations, wherein one of the thumbnail photos for each property listing is identified by a summary feature designation and the other thumbnail photos are identified by at least one of: kitchen, bedroom, bathroom, living room, and family room;
only allow access to a visitor of a video file linked by the one of the thumbnail photos for the property listing identified with the summary feature designation;
prompt the visitor to register by creating a user profile including contact information;
when the visitor registers by creating a user profile, allow access to all other video files linked by the other thumbnail photos for the property listing; track access by visitors of each of the video files;
generate interest reports of relative interest in each property listing by the visitors as a function of an extent of viewing by the visitors of the video files associated with each property listing;
identify a visitor as a lead relative to a property listing if the visitor has viewed a predetermined number of the video files for the property listing in addition to the video file that has the summary feature designation, and generate a lead report identifying the lead including contact information for the lead;
provide through the Internet the interest reports and the lead report to an owner/agent device of an owner/agent associated with the property listing, wherein said property listing server is configured to require that a registered visitor view the video file that has the summary feature designation before allowing the visitor to view any of the other video files for a property listing;
wherein the website is configured by the processor for receiving a plurality of video files from a remote user device through the Internet to upload in association with a property listing viewable on the website;
wherein the processor is further configured to upload all of the received video files as separate video files to a video hosting server through the Internet while providing identifying data pertaining to the property listing with each uploaded video file; and
wherein, after uploading all of the received video files to the video hosting server, said property listing server is further configured to receive a response from the video hosting server including a unique URL for each uploaded video file identifying the storage location on the video hosting server of the video file, store the unique URL in a database associated with that video file, and create links from the thumbnail photos to the video files associated with the unique URLs.

10. The property video listing system of claim 9, wherein said property listing server is configured to automatically generate and transmit the report identifying a visitor as a lead if that visitor views a predetermined number of the video files for the property listing.

11. The property video listing system of claim 9, wherein said property listing server determines relative interest in a property listing by a visitor by a number of video files that the visitor has viewed for the property listing.

12. The property video listing system of claim 9, wherein, for a property listing, at least one of the reports includes at least one of: a unique visitor count, a summary video count, a feature video count, a lead generation count, and a warm lead count.

13. A property video listing system comprising:
an Internet-connected property listing server having a processor configured to:
provide a website displaying property listings and providing thumbnail photos for the property listings where each of the thumbnail photos having a link to a corresponding one of at least three separate video files for each property listing wherein the at least three video files are stored on a video hosting server in communication with the property listing server through the Internet, where each of the at least three video files is identified by one of a plurality of different feature designations, wherein one of the at least three video files for each property listing is identified by a summary feature designation and the other of the at least three video files are identified by at least one of: kitchen, bedroom, bathroom, living room, and family room;
require that a visitor view the one video file that has the summary feature designation before allowing the visitor to view any of the other of the at least three video files for a property listing;
identify a visitor as a lead relative to a property listing if the visitor has viewed a predetermined number of the video files for the property listing in addition to the video file that has the summary feature designation, and generate a lead report identifying the lead including contact information for the lead;
provide through the Internet the lead report to an owner/agent device of an owner/agent associated with the property listing;
wherein the website is configured by the processor for receiving a plurality of video files from a remote user device through the Internet to upload in association with a property listing viewable on the website;

wherein the processor is further configured to upload all of the received video files as separate video files to a video hosting server through the Internet while providing identifying data pertaining to the property listing with each uploaded video file; and wherein, after uploading ail of the received video files to the video hosting server, said property listing server is further configured to receive a response from the video hosting server including a unique URL for each uploaded video file identifying the storage location on the video hosting server of the video file, store the unique URL in a database associated with that video file, and create links from the thumbnail photos to the video files associated with the unique URLs.

14. The property video listing system of claim 13, wherein said property listing server is configured to only allow access to a visitor of a video file that has a summary feature designation unless the visitor registers by creating a user profile including contact information.

* * * * *